US011699106B2

(12) United States Patent
Siddiqui et al.

(10) Patent No.: US 11,699,106 B2
(45) Date of Patent: Jul. 11, 2023

(54) CATEGORICAL FEATURE ENHANCEMENT MECHANISM FOR GRADIENT BOOSTING DECISION TREE

(71) Applicant: Microsoft Technology Licensing, LLC, Redmond, WA (US)

(72) Inventors: Mohammad Zeeshan Siddiqui, Bellevue, WA (US); Thomas Finley, Bellevue, WA (US); Sarthak Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1153 days.

(21) Appl. No.: 16/355,348

(22) Filed: Mar. 15, 2019

(65) Prior Publication Data

US 2020/0293952 A1 Sep. 17, 2020

(51) Int. Cl.
*G06N 20/20* (2019.01)
*G06F 18/213* (2023.01)
*G06F 18/2451* (2023.01)

(52) U.S. Cl.
CPC .......... *G06N 20/20* (2019.01); *G06F 18/213* (2023.01); *G06F 18/2451* (2023.01)

(58) Field of Classification Search
CPC ...... G06N 20/20; G06N 5/003; G06K 9/6232; G06K 9/6286; G06K 9/6282; G06K 9/6256
See application file for complete search history.

(56) References Cited

U.S. PATENT DOCUMENTS

| 2016/0110656 A1 | 4/2016 | Yamada et al. |
| 2016/0162793 A1 | 6/2016 | Wang et al. |
| 2018/0336487 A1 | 11/2018 | Moore et al. |
| 2019/0171957 A1* | 6/2019 | Yang .................... G06K 9/6282 |

(Continued)

FOREIGN PATENT DOCUMENTS

WO 2018006004 A1 1/2018

OTHER PUBLICATIONS

Binary Decision Trees. Packt_pub, 2018; https://medium.com/@Packt_Pub/binary-decision-trees-1ec94cfed208 (Year: 2018).*

(Continued)

*Primary Examiner* — Jianxun Yang
(74) *Attorney, Agent, or Firm* — Schwegman Lundberg & Woessner, P.A.

(57) ABSTRACT

A computer implemented method of generating a gradient boosting decision tree for obtaining predictions includes finding split points by sorting variable values of a feature by their gradient during training of the gradient boosting decision tree, performing a linear search to find a subset of variables with maximum split gain, and modifying a node of the gradient boosting decision tree to have multiple split points on the node for a feature as a function of the linear search. In a further example, a computer implemented method of controlling overfitting in a gradient boosting decision tree includes combining values of low population feature values into a virtual bin, fanning out the virtual bin into feature values having a low population, and including the low population feature values into multiple split points on a node of the gradient boosting decision tree.

17 Claims, 6 Drawing Sheets

(56) References Cited

U.S. PATENT DOCUMENTS

2019/0251468 A1* 8/2019 Guillame-Bert ....... G06N 5/003

OTHER PUBLICATIONS

"Fast Tree Regression Trainer Class", Retrieved From https://docs.microsoft.com/en-us/dotnet/api/microsoft.ml.trainers.fasttree.fasttreeregressiontrainer?view=ml-dotnet, Jan. 23, 2019, 10 Pages.

Ke, et al., "LightGBM: A Highly Efficient Gradient Boosting Decision Tree", In Proceedings of 31st Conference on Neural Information Processing, Dec. 4, 2017, pp. 1-9.

Feng, et al., "Multi-Layered Gradient Boosting Decision Trees", In Proceedings of 32nd Conference on Neural Information Processing Systems, Dec. 3, 2018, pp. 1-11.

Hu, et al., "Faster Gradient-Boosting Decision Trees", Retrieved From https://techdecoded.intel.io/resources/faster-gradient-boosting-decision-trees/#gs.1IY7ytEn, Jan. 23, 2019, 6 Pages.

* cited by examiner

| PARAMETER | VALUES |
|---|---|
| ITER (NUMBER OF TREES) | 20, 60, 80, 100 |
| NL (NUMBER OF LEAVES) | 20, 30 |
| MIL (MINIMUM DOCUMENTS FOR A LEAF) | 10, 20 |
| LR (LEARNING RATE) | 0.15, 0.20 |
| CAT (CATEGORICAL SPLIT ON/OFF) | +,- |
| MAXCAT (MAXIMUM CATEGORICAL SPLIT POINTS) | 8, 16, 32, 64, 128, 256 |
| MDOP (MINIMUM DOCUMENT PERCENTAGE FOR CATEGORICAL SPLIT) | 0.1, 0.01, 0.001, 0.0001 |
| MDO (MINIMUM DOCUMENTS FOR CATEGORICAL SPLIT) | 0, 50, 100, 200 |

FIG. 4

| DATASET (KAGGLE) | NAME | | CRITEO-CLICK PREDICTION | | AVAZU-CLICK PREDICTION | | AD TRACKING DATA AND TRACKING FRAUD DETECTION | | FLIGHT DELAY | |
|---|---|---|---|---|---|---|---|---|---|---|
| | DATASET ROW COUNT IN MILLIONS | TRAINING | 44 | | 39 | | 175 | 50 | 10 | 1 |
| | | TEST | 1 | 0.250 | 1 | | 10 | 5 | 0.689 | 0.689 |
| | FEATURE COUNT | NON-CATEGORICAL | | 13 | | | | 0 | | 5 |
| | | CATEGORICAL | | 26 | | 22 | | 6 | | 5 |
| WITHOUT CATEGORICAL SPLITS | AUC | | 0.7690 | 0.7719 | 0.7201 | | 0.9722 | 0.9757 | 0.6945 | 0.6937 |
| | TREES | | 100 | 100 | 100 | | 100 | 100 | 100 | 100 |
| | TIME IN SECONDS | TOTAL | 2828 | 98 | 1858 | | 5449 | 1617 | 113 | 19.38 |
| | | PRE-TRAINING | 995.44 | 35.34 | 423.08 | | 662.41 | 204.37 | 19 | 3.5 |
| | | TRAINING | 1800.42 | 42.52 | 1388.811 | | 4724.24 | 1376.76 | 87 | 12.23 |
| | | SAVING MODEL | 8.23 | 6.62 | 26.26 | | 1.83 | 2.17 | 0.16 | 0.17 |
| | | EVERYTHING ELSE + PREDICTION | 23.91 | 13.52 | 19.849 | | 70.52 | 33.7 | 6.84 | 3.48 |
| WITH CATEGORICAL SPLITS (ORS) | AUC | | 0.7924 | 0.7806 | 0.7306 | | 0.9781 | 0.9825 | 0.6987 | 0.6972 |
| | TREES | | 100 | 100 | 100 | | 100 | 100 | 60 | 60 |
| | TIME IN SECONDS | TOTAL | 2244 | 96 | 1457 | | 2039 | 775 | 82.555 | 15.834 |
| | | PRE-TRAINING | 1037.42 | 30.89 | 449.69 | | 532.46 | 197.99 | 21 | 3.3769 |
| | | TRAINING | 1170.64 | 42.84 | 957.23 | | 1428.97 | 527.86 | 56 | 8.45 |
| | | SAVING MODEL | 7.17 | 6.29 | 26.56 | | 12.35 | 15.93 | 0.19 | 0.18 |
| | | EVERYTHING ELSE + PREDICTION | 28.77 | 15.98 | 23.52 | | 65.22 | 33.22 | 5.386 | 3.8271 |
| DELTA | WITH AND WITHOUT CATEGORICAL SPLIT | AUC | 3.05% | 1.12% | 1.46% | | 0.61% | 0.70% | 0.62% | 0.51% |
| | | | 0.0234 | 0.0087 | 0.0105 | | 0.0059 | 0.0068 | 0.0043 | 0.0035 |
| | | TIME | -20.65% | -2.04% | -21.58% | | -62.58% | -52.07% | -26.94% | -18.30% |
| | | | -584 | -2 | -401 | | -3410 | -842 | -30.445 | -3.546 |

FIG. 5

CATEGORICAL FEATURE ENHANCEMENT MECHANISM FOR GRADIENT BOOSTING DECISION TREE

BACKGROUND

A gradient boosting decision tree is an algorithm that can be used for classification and regression problems. Gradient boosting decisions trees are represented as a tree-like set of nodes forming a branch-like structure, in which each internal node represents a "test" on an attribute (e.g. if the age of a person is greater than or equal to 18), each branch represents the outcome of the test, and each leaf node represents a numerical score that is mapped to a class label (decision taken after computing all attributes). The paths from root to leaf represent classification rules. Gradient boosting decision trees may be used to reach a conclusion or predict an event or outcome given the input.

Gradient boosting is a machine learning technique for regression and classification problems, which produces a prediction model in the form of an ensemble of weak prediction models, typically decision trees. The technique builds the prediction model in a stage-wise fashion and generalizes the prediction model by allowing optimization of an arbitrary differentiable loss function.

SUMMARY

A computer implemented method of generating a gradient boosting decision tree for obtaining predictions includes finding split points by sorting variable values of a feature by their gradient during training of the gradient boosting decision tree, performing a linear search to find a subset of variables with maximum split gain, and modifying a node of the gradient boosting decision tree to have multiple split points on the node for a feature as a function of the linear search.

In a further example, a computer implemented method of controlling overfitting in a gradient boosting decision tree includes combining values of low population feature values into a virtual bin, fanning out the virtual bin into feature values having a low population, and including the low population feature values into multiple split points on a node of the gradient boosting decision tree.

BRIEF DESCRIPTION OF THE DRAWINGS

FIG. 4 is a table illustrating parameters and values based on a sweep of machine learning performance with multiple split points turned on and off according to an example embodiment.

FIG. 5 is a table illustrating test result for various example applications using multiple split points according to an example embodiment.

DETAILED DESCRIPTION

Figure 1A:
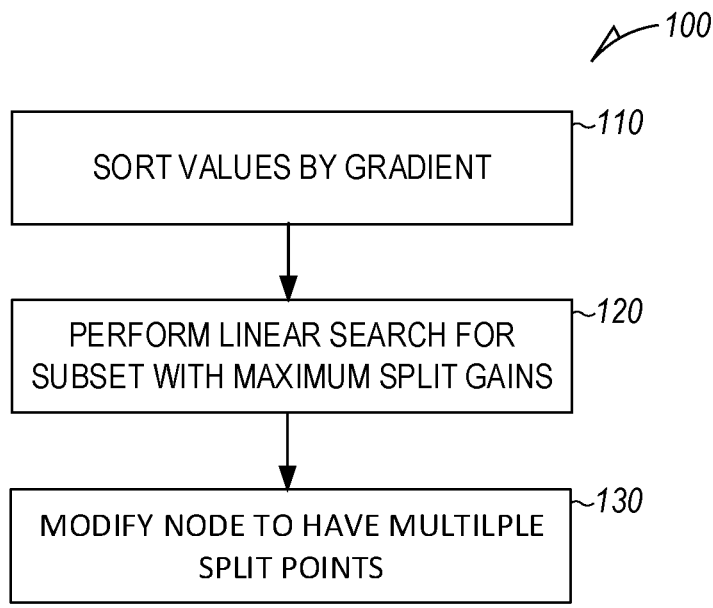
FIG. 1A is a flowchart illustrating a computer implemented method of improving a decision tree utilizing multiple split points according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A machine learning algorithm constructs a gradient boosting decision tree by evaluating each feature-value pair in the training dataset for best split gain at a node. The algorithm then partitions the data based on this feature-value pair and this process is repeated on the child nodes until a terminating condition such as max leaves or minimum documents per leaf is reached. This process of creating a gradient boosting decision tree is repeated to create more decision trees to better classify the data that was classified incorrectly by giving it a higher weight to reduce the overall loss. The process of building a series of learners or decision trees continues until some terminating condition such as maximum trees/iterations is reached. Example gradient boosting decision trees include FastTree, XGBoost, AdaBoost, and others.

At a node in a decision tree, one feature-value pair is chosen as a split point. At the time of inferencing or scoring the tree is traversed by comparing input feature values to this feature-value split point. The feature at a node tells what feature to look for in the input and informs what value to compare against, and based on the evaluation, a left or right turn is taken in the tree traversal. The leaf nodes contain a numerical score that is used to make a decision An optimization is performed for categorical variables in a gradient boosting decision tree. Typically, decision trees maintain a single threshold as a split point on a node. Maintaining multiple split points on a node in the case of categorical variables improves accuracy, referred to as the area under the curve, and significantly reduces training time. The use of such split points can also result in lower computing resource utilization during use of the trees to make predictions, as the gradient boosting decision tree is generally more balanced and requires fewer resources to traverse.

Methods are described that improve the area under the curve for a gradient boosting decision tree to maintain multiple split points on a node of decision tree algorithm, instead of one, and prevent overfitting by combining low population feature values during a node split process. Split points are identified by sorting the values of a feature seen during training by their gradient (ratio of sum weight and count) and then doing a linear search to find the contiguous subset with maximum split.

Overfitting is prevented by combining low population feature values during node split process to achieve better accuracy and speed. Maintaining multiple split points on a node in the case of categorical variables improves area under the curve up to second decimal (3.05%) on real ad click prediction datasets and reduces training time by as much as 62% on datasets that were benchmarked.

The accuracy of the tree is improved by introducing more expressive split points for categorical variables. An example would be expanding the split point to include more than one value, such instead of the age being greater than 18, the split point may determine if the age is 5 or 6 or 7 or 10 or 11 or 18. Such a split point is said to be more expressive, or alternatively, more accurate. A categorical variable is one that takes on discrete values, such as day, month, city, etc. At the time of scoring, instead of doing comparison on a single feature-value pair a logical OR is done on multiple feature-values (as node split feature) with the input feature-value.

FIG. 1A is a flowchart illustrating a computer implemented method 100 of improving a gradient boosting decision tree. While decision trees may be used in multiple different applications, one application used for discussion herein, is that of predicting on-time performance for scheduled airplane flights. Example categorical variables may include airline carrier, day of the week, and date of month.

Method 100 begins by finding split points by sorting values of a feature during training by their gradient at operation 110. The gradient of a feature is obtained as a ratio of sum weight and count for the feature. Given a set of discrete feature values, example for feature say "color" the values could look like "red", "green", "blue", "yellow". The values are sorted by gradient.

A linear search or scan of the sorted values is performed at operation 120 to include values in our split points as long as split gain is increasing and not decreasing. This is a "dynamic programming" approach to find a subset with maximum gain.

At operation 130, a node of the gradient boosting decision tree is modified to have multiple split points on the node for a feature with values based on the sorted values found by the linear search. Generating the gradient boosting decision tree may include modifying an existing gradient boosting decision tree.

Figure 1B:
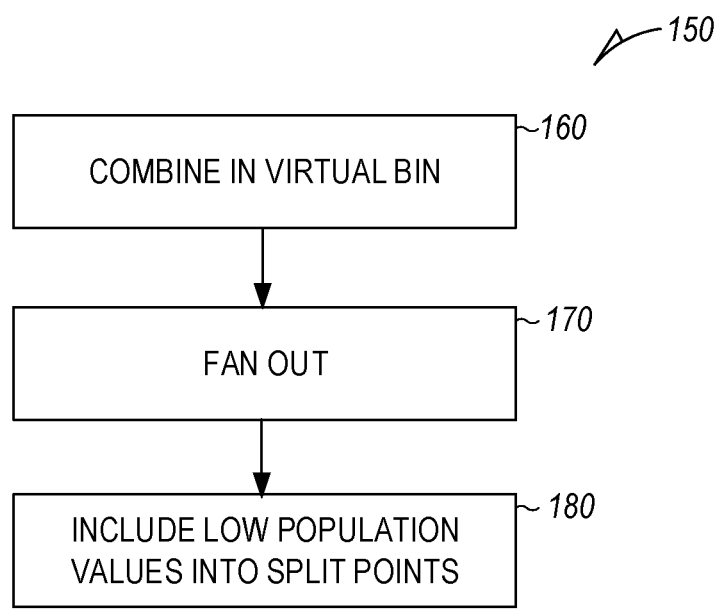
FIG. 1B is a flowchart illustrating a computer implemented method of preventing overfitting according to an example embodiment.

To prevent overfitting, a method 150, illustrated in flowchart form in FIG. 1B, may be performed prior to method 100. Values of low population are combined into a virtual bin at operation 160. An explicit count or relative percentage of values comprising a low population may be set by a user. The virtual bin is fanned out at operation 170 into feature values that were low population. At operation 180, the low population values are included into the split points. The concept of knobs is illustrated below and is basically a construct to allow one to adjust the overfitting properties by setting different thresholds or tests to control the amount of overfitting.

Method 150, is specific to prevent discrimination or bias against feature values that may be important but have fewer count and hence their gradient will be less and that will result in them being excluded from split points. These feature values are combined as if they were one feature value and then included in the array of feature values before the linear scan 120 to find the subset with maximum gain. If this combined feature values is included in the split points, a fan out is performed and all these values are represented in the split points.

Figure 2:
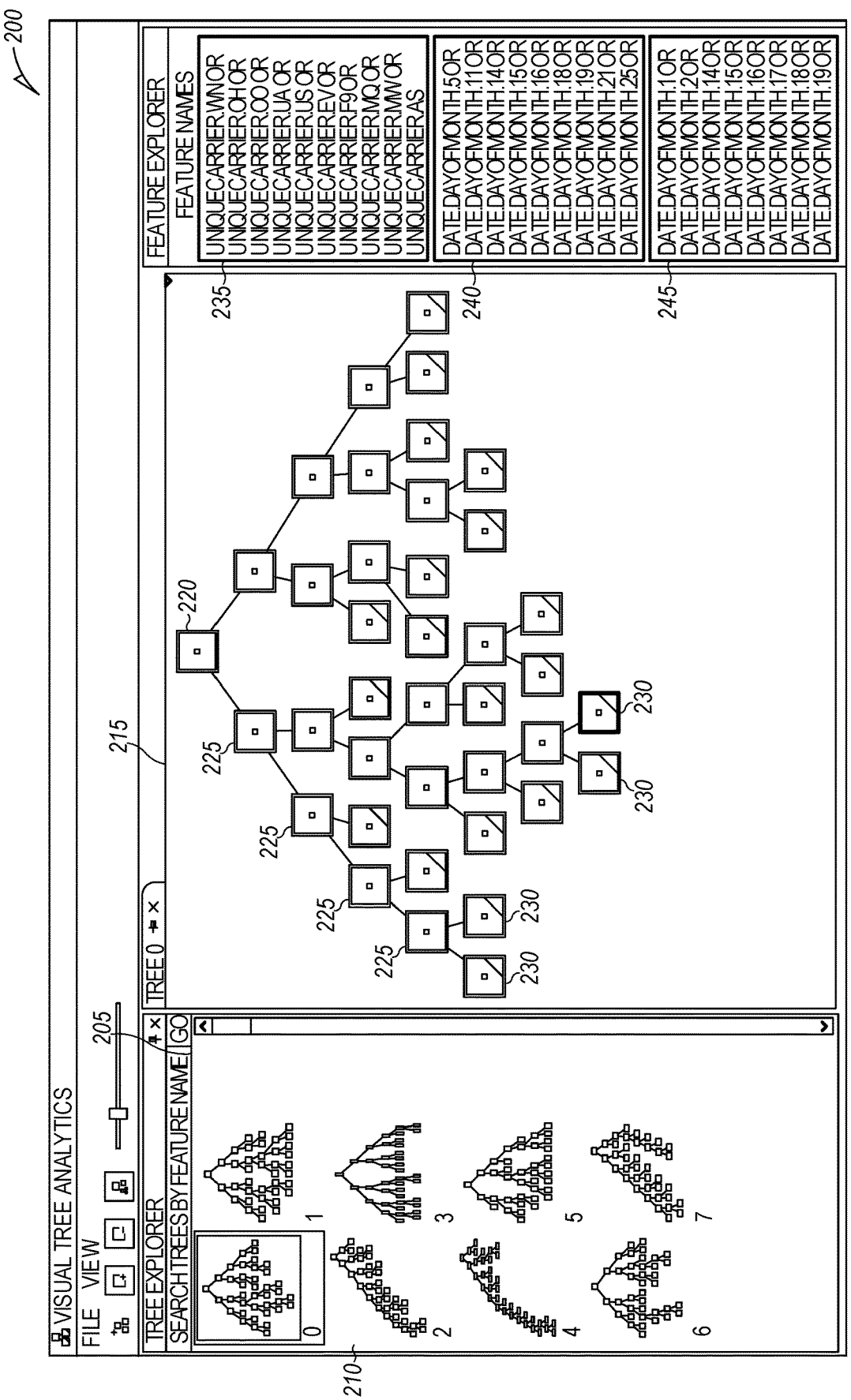
FIG. 2 is a user interface for interacting with decision trees and providing multiple split points according to an example embodiment.

As an example, Microsoft FastTree was trained on Flight Delay-1M dataset using categorical splits as illustrated at a user interface 200 in FIG. 2. A list of trees is illustrated in a tree explorer box 205, with one of the trees 210 being selected for viewing in a larger, tree window 215. Tree window 215 illustrates a single root node 220 and multiple internal nodes 225. Leaf nodes 230 are indicated at the bottom of the tree and represent a numerical score that is mapped to a decision, in this case, whether or not a flight will be delayed.

The split feature chosen at the first node is "UniqueCarrier" and its list of values chosen are WN, OH, OO, UA, US, EV, etc., separated by "OR" as indicated in box 235. This means at the time of scoring the evaluation at the node will be true if "UniqueCarrier" feature in the input has a value that is equal to any of the values in box 235: (i.e., WN, OH, OO, UA, etc.). As child nodes are encountered, the split feature chosen are seen to be "Date.DayOfMonth", though the same feature has been chosen but the list of feature values are different as shown in boxes 240 and 245.

Figure 3:
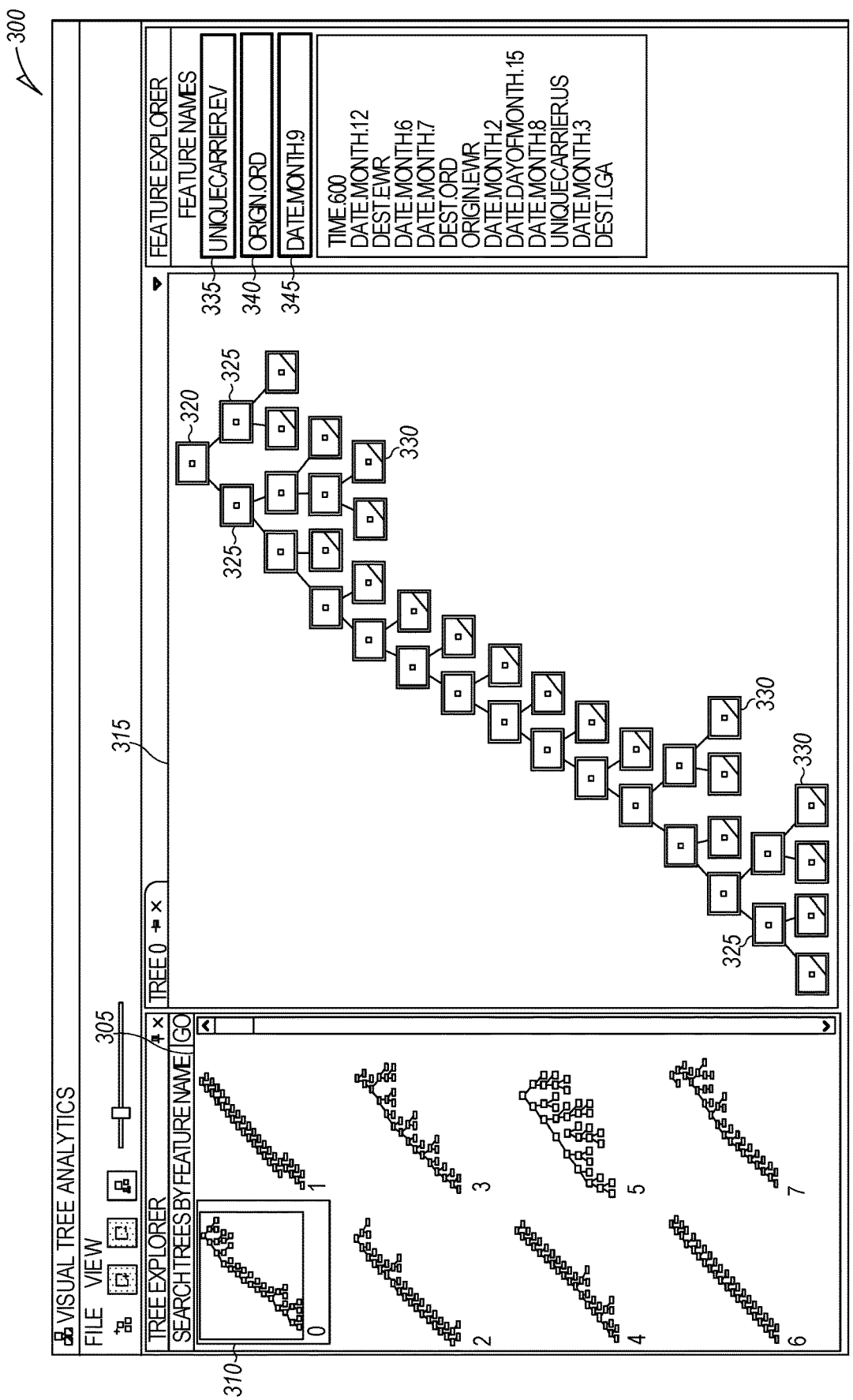
FIG. 3 is a user interface for interacting with decision trees illustrating decision trees without the use of multiple split points according to an example embodiment.

In FIG. 3 at user interface 300, the same training data was used with FastTree but without a categorical split feature. A list of trees is illustrated in a tree explorer box 305, with one of the trees 310 being selected for viewing in a larger, tree window 315. Tree window 315 illustrates a single root node 320 and multiple internal nodes 325. Leaf nodes 330 are indicated at the bottom of the tree and represent decisions, in this case, whether or not a flight will be delayed.

The split feature on the first node is "UniqueCarrier" and it has single split value 'EV' at box 335, the split features chosen on child nodes is "Origin" at box 340 with split value as "ORD" and the split feature chosen on another child node is "Date.Month" at box 345 with split value as "9". Comparing the trees at tree explore boxes 205 with categorical splits and box 305 without categorical splits, it is seen that the trees constructed using categorical splits are in general balanced and have less branching in comparison to trees constructed without categorical splits that are mostly imbalanced with extreme branching.

Split points may be found by sorting the values of a feature seen during training by their gradient (ratio of sum weight and count) and then doing a linear search to find the subset with maximum split gain. This is a dynamic programming approach to find a subset of split points that constitute a good but not the best split gain and has a linear runtime.

One of the challenges of categorical split points is overfitting because the split points are expressive. Since the values of a feature are sorted by gradient it is very easy to not include a value that has fewer document counts as part of the split points as it will have a low gradient and will be placed on the other side of the sorted array. To overcome this, values that are "low population" are combined into one virtual bin prior to carrying out the split procedure. If the virtual bin is part of feature values that are chosen as the split point the virtual bin is fanned out into feature values that were low population and are included in split points. This approach helps with overfitting by generalizing the tree and by reducing the number of feature values to scan in the split process results in a faster training time. Knobs to control overfitting and improve the performance include one or more of the following:

1. Maximum categorical split points—Split process could continue and introduce too many split points that can overfit the dataset and even slow down training. This knob sets the upper limit on the number of split points.

2. Minimum Document Percentage for Categorical Split—This knob is used to identify low population bins to construct virtual bin. The knob indicates the minimum documents a bin needs to have so that it is not classified as a low population bin. It calculates minimum documents as a percentage of documents at that node.

3. Minimum Documents for Categorical Split—Same as above but this knob allows the passing of a constant value for the minimum number of documents to include.

4. Bundling—Used to turn on/off combining low population feature values into a virtual bin.

The use of categorical splits has been tested by training and testing on several datasets that have categorical variables. Some example datasets included:

1. Criteo dataset (Kaggle). Criteo is an online display advertisement company and this dataset is used to predict if the user is going to click an ad. It has ~46 million rows in its training test. Two subsets of the dataset were used for train-test datasets. In a first test, the top 44 million rows were used to for training and the bottom 1 million were used for testing. In a second test, 1 million rows were used for training and 0.25 million rows were used for testing.

2. Avazu dataset (Kaggle—a machine learning platform). Avazu is an advertisement platform based in Brunei in Asia. The dataset is used to predict whether a mobile ad will be clicked. The dataset has ~40M rows in training set. The top 39M rows were used for a training dataset and bottom 1M rows for a test dataset 3. TalkingData AdTracking Fraud Detection Challenge (Kaggle). The goal is to predict if a user will download an app after clicking a mobile app ad. The dataset has ~185M rows for training. Two different tests were conducted on different divisions of the training set. In a first test, the top 175 million rows were used for training and bottom 10 million rows were used for testing. In a second test, from top 180 million rows were randomly chosen, 50 million rows (subsampled) for test and then from bottom took 5 million rows for test.

4. Flight delay dataset. Predict whether a flight will be delayed. There are two datasets. The first dataset has training set of 10 million rows and other dataset has training set of 1 million rows. The test set for both have 0.689 million rows.

A hyperparameter sweep was performed on the parameters illustrated in the table 400 in FIG. 4 on benchmarking platform to show learning performance for each dataset to get the best AUC (area under the curve) with the categorical splits feature turned on and off. The first four parameters are common to gradient boosting decision trees with and without the categorical split optimization. The last three parameters are specific to categorical features optimization.

Results are shown in table 500 in FIG. 5 where:
1. AUC—Area under the curve.
2. Time—Total time to carry our train-test experiment.
3. Pre-training—Time spent before training such as FastTree data preparation, in-memory binning, feature conversion and transforms.
4. Training—Time spending during training.
5. Everything else+prediction–producing Total Time–(Pre-training+Training+Saving Model)

Various speed gains may be observed.

1. Pre-Training—FastTree with categorical splits often performs better in pre-training even though the split logic and inferencing happens later. This is because in pre-training FastTree will try to figure out one-hot categorical feature boundaries in the feature vector using heuristics but with categorical splits turned on these boundaries are given explicitly by the user using categorical transform that marks the column as categorical. Feature boundaries are preserved in the metadata of the column when a concat or drop slots transform is applied.

2. Training is where bulk of the speed gain comes from because in the split logic during combining of low population bins/feature values into a single virtual bin we reduce the number of bins to scan to find the best split point and maximize split gain.

3. Post-Training—By having multiple split points in a node, branching is reduced. Reduced branching results in some speed gain but at the same time, the binary search to see if an input feature value is present in the list of categorical split values in a node (logical OR) could take up few extra cycles.

Overall there is significant speed gains across all the six datasets that were tested on and these gains become more pronounced with larger datasets.

Accuracy gains—An increased AUC was observed by using categorical split features across all the datasets and these gains are either in second or third decimal places. In the experiment setup the ad click prediction test datasets had document count ranging from 1 million to 10 million, so this translates to substantial increase in the revenue if used with these results and setup. The accuracy gains also increase with larger datasets except in the case of "Talking data ad tracking fraud detection" where the accuracy gain was marginal between large and small dataset because the smaller dataset (50M rows) was subsampled from the original dataset of 185M rows so it had nearly the same level of coverage as the larger dataset with 175M rows.

AUC and speed gains increase with the number of categorical features in the dataset, as the use of categorical splits appears to benefit datasets with high number of categorical features. This occurs because the algorithm can be more expressive about the split points on a node by maintaining more than one of them that better confines the feature space for a label during training. The challenge with being more expressive about split point is overfitting that was countered using the bundling technique to generalize the tree while still being expressive about split points. Splits also made the trees more compressed and balanced, a property that could improve speed during inferencing.

Figure 6:
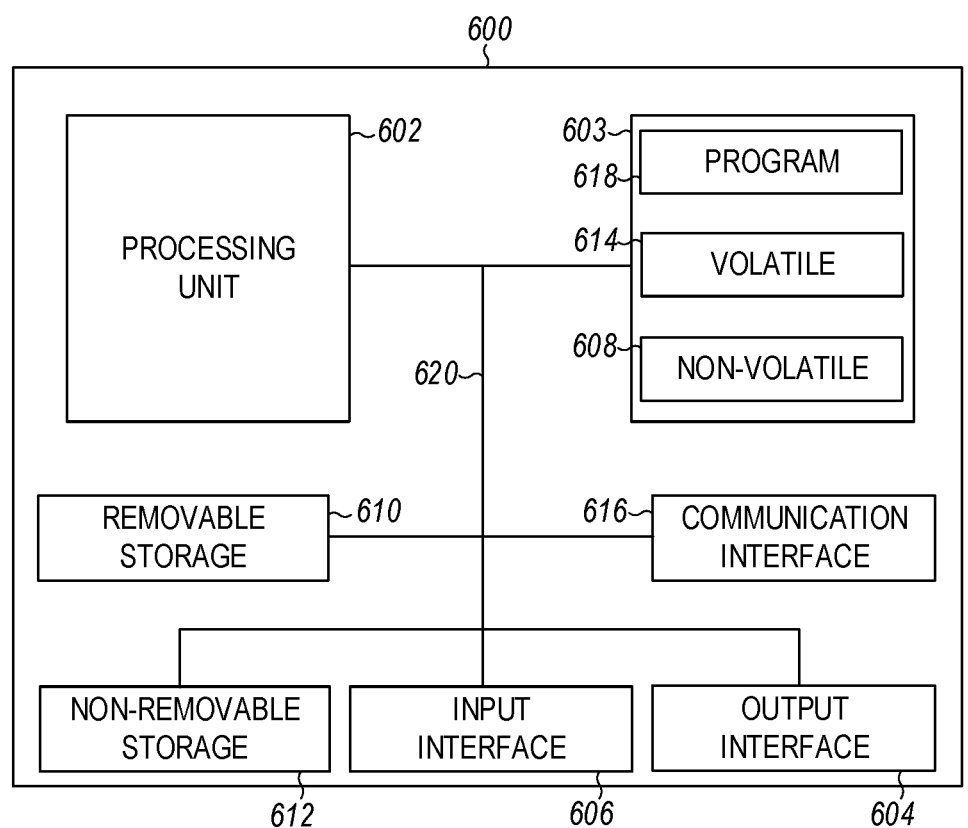
FIG. 6 is a block schematic diagram of a computer system to implement one or more example embodiments.

FIG. 6 is a block schematic diagram of a computer system 600 to implement and manage decision trees utilizing multiple split points, preventing overfitting, and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods for using multiple split points in decision trees and for preventing overfitting. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method of generating a gradient boosting decision tree for obtaining predictions includes finding split points by sorting variable values of a feature by their gradient during training of the gradient boosting decision tree, performing a linear search to find a subset of variables with maximum split gain, and modifying a node of the gradient boosting decision tree to have multiple split points on the node for a feature as a function of the linear search.

2. The method of example 1 and further including prior to finding split points, controlling overfitting by combining values of low population feature values into a virtual bin, fanning out the virtual bin into feature values having a low population, and including the low population feature values into the split points.

3. The method of example 2 and further including using at least one knob to control overfitting.

4. The method of example 3 and further including setting an upper limit on a number of split points via a maximum split point knob.

5. The method of example 3 and further comprising setting a minimum number of documents for a categorical split via a minimum knob.

6. The method of example 3 and further including using a bundling control knob to turn on or off the operation of combining low population feature values into the virtual bin.

7. The method of any of examples 1-6 wherein the decision tree is a gradient boosting binary tree.

8. The method of any of examples 1-7 wherein the gradient of the feature is determined as a ratio of a sum weight and count.

9. The method of any of examples 1-8 wherein during training of the gradient boosting decision tree, at a time of scoring, a logical OR is performed on multiple feature values at a node with the input feature-value.

10. A machine-readable storage device has instructions for execution by a processor of a machine to cause the processor to perform operations to perform a method of improving a gradient boosting decision tree for obtaining predictions. The operations include finding split points by sorting variable values of a feature by their gradient during training of the gradient boosting decision tree, performing a linear search to find a subset of variables with maximum split gain, and modifying a node of the gradient boosting decision tree to have multiple split points on the node for a feature as a function of the linear search 11. The device of example 10 wherein the operations further comprise prior to finding split points, controlling overfitting by combining values of low population feature values into a virtual bin, fanning out the virtual bin into feature values that were low population, and including the low population feature values into the split points.

12. The device of example 11 and further including using at least one knob to control overfitting.

13. The device of example 12 wherein the at least one knob provides an upper limit on a number of split points via a maximum split point knob, a minimum number of documents for a categorical split via a minimum knob, and a bundling control knob to turn on or off the operation of combining low population feature values into the virtual bin.

14. The device of any of examples 10-13 wherein the decision tree is a gradient boosting binary tree.

15. The device of any of examples 10-14 wherein the gradient of a feature is determined as a ratio of a sum weight and count.

16. The device of any of examples 10-15 wherein during training of the gradient boosting decision tree, at a time of scoring, a logical OR is performed on multiple feature-values at a node with the input feature-value.

17. A device includes a processor and a memory device coupled to the processor and having a program stored thereon for execution by the processor to perform operations. The operations include finding split points by sorting variable values of a feature by their gradient during training of the gradient boosting decision tree, performing a linear search to find a subset of variables with maximum split gain, and modifying a node of the gradient boosting decision tree to have multiple split points on the node for a feature as a function of the linear search.

18. The device of example 17 wherein the operations further include, prior to finding split points, controlling overfitting by combining values of low population feature values into a virtual bin, fanning out the virtual bin into feature values that were low population, and including the low population feature values into the split points.

19. The device of example 18 wherein the operations further include using at least one knob to provide an upper limit on a number of split points via a maximum split point knob, a minimum number of documents for a categorical split via a minimum knob, and a bundling control knob to turn on or off the operation of combining low population feature values into the virtual bin.

20. The device of any of examples 17-19 wherein the gradient boosting decision tree is a gradient boosting linear binary tree, wherein the gradient of a feature is determined as a ratio of a sum weight and count, and wherein during training of the gradient boosting decision tree, at a time of scoring, a logical OR is performed on multiple feature-values at a node with the input feature-value.

21. In a further example, a computer implemented method of controlling overfitting in a gradient boosting decision tree includes combining values of low population feature values into a virtual bin, fanning out the virtual bin into feature values having a low population, and including the low population feature values into multiple split points on a node of the gradient boosting decision tree.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of generating a gradient boosting decision tree for obtaining predictions, the method comprising:
   combining values of low population feature values into a virtual bin;
   fanning out the virtual bin into feature values having a low population;
   finding split points by including the low population feature values into the split points and sorting variable values of a feature by their gradient during training of the gradient boosting decision tree;
   performing a linear search to find a subset of variables with maximum split gain; and
   modifying a node of the gradient boosting decision tree to have multiple split points on the node for a feature as a function of the linear search.

2. The method of claim 1 and further comprising using at least one knob to control overfitting.

3. The method of claim 2 and further comprising setting an upper limit on a number of split points via a maximum split point knob.

4. The method of claim 2 and further comprising setting a minimum number of documents for a categorical split via a minimum knob.

5. The method of claim 3 and further comprising using a bundling control knob to turn on or off the operation of combining low population feature values into the virtual bin.

6. The method of claim 1 wherein the decision tree is a gradient boosting binary tree.

7. The method of claim 1 wherein the gradient of the feature is determined as a ratio of a sum weight and count.

8. The method of claim 1 wherein during training of the gradient boosting decision tree, at a time of scoring, a logical OR is performed on multiple feature values at a node with the input feature-value.

9. A machine-readable storage device having instructions for execution by a processor of a machine to cause the processor to perform operations to perform a method of improving a gradient boosting decision tree for obtaining predictions, the operations comprising:
   combining values of low population feature values into a virtual bin;
   fanning out the virtual bin into feature values having a low population;
   finding split points by including the low population feature values into the split points and sorting variable values of a feature by their gradient during training of the gradient boosting decision tree
   performing a linear search to find a subset of variables with maximum split gain; and modifying a node of the gradient boosting decision tree to have multiple split points on the node for a feature as a function of the linear search.

10. The device of claim 9 and further comprising using at least one knob to control overfitting.

11. The device of claim 10 wherein the at least one knob provides:
   an upper limit on a number of split points via a maximum split point knob;
   a minimum number of documents for a categorical split via a minimum knob; and
   a bundling control knob to turn on or off the operation of combining low population feature values into the virtual bin.

12. The device of claim 9 wherein the decision tree is a gradient boosting binary tree.

13. The device of claim 9 wherein the gradient of a feature is determined as a ratio of a sum weight and count.

14. The device of claim 9 wherein during training of the gradient boosting decision tree, at a time of scoring, a logical OR is performed on multiple feature-values at a node with the input feature-value.

15. A device comprising:
   a processor; and
   a memory device coupled to the processor and having a program stored thereon for execution by the processor to perform operations comprising:
   combining values of low population feature values into a virtual bin;
   fanning out the virtual bin into feature values having a low population;
   finding split points by including the low population feature values into the split points and sorting variable values of a feature by their gradient during training of the gradient boosting decision tree;
   performing a linear search to find a subset of variables with maximum split gain; and
   modifying a node of the gradient boosting decision tree to have multiple split points on the node for a feature as a function of the linear search.

16. The device of claim 15 wherein the operations further comprise using at least one knob to provide:
   an upper limit on a number of split points via a maximum split point knob;
   a minimum number of documents for a categorical split via a minimum knob; and
   a bundling control knob to turn on or off the operation of combining low population feature values into the virtual bin.

17. The device of 15 wherein the gradient boosting decision tree is a gradient boosting linear binary tree, and wherein during training of the gradient boosting decision tree, at a time of scoring, a logical OR is performed on multiple feature-values at a node with the input feature-value.

* * * * *